United States Patent
Steinmacher-Burow

(10) Patent No.: US 9,329,895 B2
(45) Date of Patent: May 3, 2016

(54) READER-WRITER LOCK

(71) Applicant: International Business Machines Corporation, Armonk, NY (US)

(72) Inventor: Burkhard Steinmacher-Burow, Esslingen (DE)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/160,675

(22) Filed: Jan. 22, 2014

(65) Prior Publication Data

US 2015/0205733 A1 Jul. 23, 2015

(51) Int. Cl.
*G06F 9/52* (2006.01)
*G06F 9/50* (2006.01)

(52) U.S. Cl.
CPC ... *G06F 9/50* (2013.01); *G06F 9/52* (2013.01); *G06F 9/526* (2013.01)

(58) Field of Classification Search
CPC .................................. G06F 9/52; G06F 9/526
See application file for complete search history.

(56) References Cited

U.S. PATENT DOCUMENTS

| | | | |
|---|---|---|---|
| 6,823,511 B1 | 11/2004 | McKenney et al. | |
| 7,934,062 B2 | 4/2011 | McKenney et al. | |
| 8,127,303 B2 | 2/2012 | Kukanov et al. | |
| 8,145,817 B2 | 3/2012 | Detlefs | |
| 8,347,045 B2 | 1/2013 | Mealey et al. | |
| 2009/0044194 A1* | 2/2009 | Rathi | G06F 9/526 718/104 |
| 2013/0290967 A1* | 10/2013 | Calciu | G06F 9/526 718/102 |

OTHER PUBLICATIONS

Bhatt, V., et al., "Constant RMR Solutions to Reader Writer Synchronization", PODC'10, Jul. 25-28, 2010, Zurich, Switzerland. Copyright 2010 ACM 978-1-60558-888-9/10/07.
Brandenburg, B., et al., "Reader-Writer Synchronization for Shared-Memory Multiprocessor Real-Time Systems", Department of Computer Science, University of North Carolina at Chapel Hill http://www.cs.unc.edu/~anderson/papers/ecrts09b.pdf.
Calciu, I., et al., "NUMA-Aware Reader-Writer Locks", Proceedings of the 18th ACM SIGPLAN symposium on Principles and practice of parallel programming. Shenzhen, China. pp. 157-166. ACM New York, NY, USA 2013.978-1-4503-1922-5/13/02.
Unknown, "Linux Cross Reference—Free Electrons", http://lxr.free-electrons.com/source/include/asm-generic/atomic64 Copyright © 2009 Paul Mackerras, IBM Corp.
Unknown, "Memory Ordering", Wikipedia, page last modified on Dec. 28, 2013 at 00:37. http://en.wikipedia.org/wiki/Memory_ordering.

* cited by examiner

*Primary Examiner* — Ryan Bertram
(74) *Attorney, Agent, or Firm* — Stosch Sabo; Keivan E Razavi

(57) ABSTRACT

A method and system for implementing a reader-writer lock having a write lock requested by a thread is disclosed. The reader-writer lock is structured to have counters and a flag. The counters use an atomic process to count read locks held or outstanding read lock requests. The flag identifies a counter and is configured to distinguish between counters. A read lock is prepared, acquired, and released. The atomic process is used and the flag or flagged counter is polled. A write lock is prepared, acquired, and released.

8 Claims, 6 Drawing Sheets

READER-WRITER LOCK

BACKGROUND

This disclosure relates generally to computer systems and, more particularly, relates to a reader-writer lock. A reader-writer lock controls access to a shared resource, allowing concurrent access to multiple threads for reading but restricting access to a single thread for writes (or other changes) to the resource. A common use might be to control access to a data structure in memory that can not be updated atomically and is not valid (and should not be read by another thread) until the update is complete. Such access to a shared resource may be referred to as a critical section. A thread acquires a read lock before reading the shared resource and releases the read lock after reading the shared resource. Multiple threads may each concurrently hold a read lock. A thread acquires a write lock before writing the shared resource and releases the write lock after writing the shared resource. While a thread holds a write lock, no other thread may hold a read lock nor hold a write lock.

SUMMARY

Aspects of the disclosure include a method for implementing a reader-writer lock having a write lock requested by a thread. The method can include structuring the reader-writer lock to have a first counter, a second counter, and a flag. The first counter may be configured to count a number of read locks held. An atomic process may be used to increment the first counter in response to a first bit of the first counter being enabled. In embodiments, the first bit may be initially set to be enabled. The second counter may be configured to count a number of outstanding read lock requests. The atomic process may be used to increment the second counter in response to a second bit of the second counter being enabled. In embodiments, the second bit may be initially set to be disabled. The flag may identify either the first counter or the second counter but not both, and can be configured to discern the first counter from the second counter. In embodiments, the flag may be initially set to identify the first counter.

Aspects of the disclosure may include preparing a read lock associated with a flagged counter of the first and second counters. The preparing can include using the atomic process in association with at least one counter of the first and second counters. The read lock may be acquired by polling the flag to identify the flagged counter of the first and second counters. The read lock can be released using the flagged counter to decrement a value of the flagged counter.

Aspects of the disclosure may include preparing a write lock. The preparing can include disabling the flagged counter and enabling an unflagged counter of the first and second counters. The write lock may be acquired by polling the flagged counter until the value of the flagged counter reaches zero. The write lock can be released using the flag to unflag the flagged counter and flag the unflagged counter.

DETAILED DESCRIPTION

Figure 1:
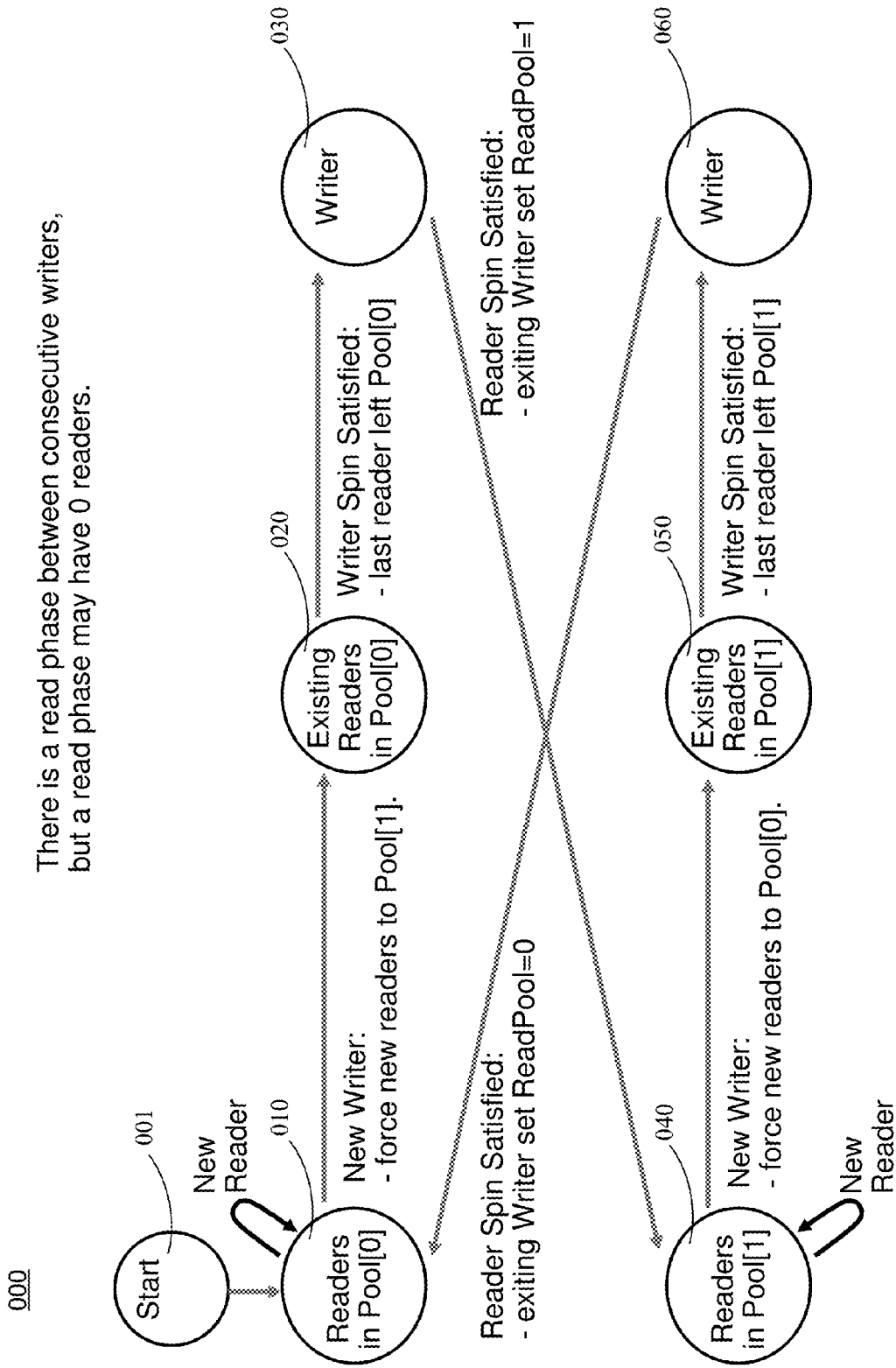
FIG. 1 is a state diagram of a reader-writer lock methodology for a single particular thread to acquire a write lock according to embodiments.

Aspects of the disclosure relate to a reader-writer lock. In embodiments, the method and system disclosed present an atomic method which atomically admits a read request (i.e., read process, reader) to a pool of a set of pools only if the pool is admitting. The reader-writer lock as described may positively impact performance. The positive impact in performance may be present for multi-threaded applications in particular. Specifically, performance may be positively impacted in relation to speed and/or efficiency.

Positive performance impacts may include elements that are fair (e.g., first-come-first-served), with low overhead, with high throughput, and that allow priority read/write requests (i.e., read/write processes, readers/writers). A simple methodology can, for example, assist to verify correctness or add priorities. In embodiments, a write lock may be acquired by only a single particular thread. A global variable may identify one pool of the set of pools that has active readers. Implementation may be software-based (e.g., using Compare and Swap (CAS) or Load-Link and Store-Conditional (LL/SC)) or hardware-based (e.g., using a memory system provided Atomic Memory Operation (AMO) such as fetch-and-add).

Aspects of the disclosure include a method for processing a set of access requests (e.g., read, write) of a resource shared by a set of threads. The method includes creating a set of pools for storing the set of access (read) requests of the resource (read requests are stored in the set of pools, multiple writers are queued using a ticket-and-turn system). The set of pools include a first pool configured to be active. The set of pools include a second pool configured to be inactive.

The method includes processing a first request of a first type (e.g., read or reader) of the set of access requests of the first pool. The first request of the first type may use a first quantity of processing resources. In embodiments, storing of requests may be initiated in a particular pool only when the particular pool is set to allow for such storage. The processing may be atomically processing in an order defined by a processing strategy. The processing strategy may initiate storing of the first request to the first pool in response to the first request and existence, at an address related to the resource, of a first logical value associated with the set of pools. The processing strategy may initiate storing of the first request to the second pool in response to the first request and existence, at the address related to the resource, of a second logical value associated with the set of pools.

The method includes switching (exchanging), in response to processing a second request of a second type (e.g., write or writer) of the set of access requests of the first pool, the first pool to be the second pool configured to be inactive and the second pool to be the first pool configured to be active. The second request of the second type may use a second quantity of processing resources. The first quantity of processing resources may be different from the second quantity of processing resources. In embodiments, the switch is performed in response to reaching a threshold count of a count of requests of the set of access requests initiated to be stored in the first pool. For example, the switch may occur when the threshold count reaches zero (i.e., the pool is empty).

In embodiments, the second request of the second type of the set of access requests of the first pool may be processed in response to processing a third request of a third type (e.g., another read) of the set of access requests initiated for storage in the first pool subsequent to the second request being initiated for storage in the first pool. In this way, a specific request may be given priority. For example, a new read request may be given priority over an existing write request. Further to such embodiments just described, in certain other embodiments, the second request of the second type of the set of access requests of the first pool may be processed in response to processing a fourth request of a fourth type (e.g., another write) of the set of access requests initiated for storage in the first pool subsequent to the second request being initiated for storage in the first pool. For example, a new write request may be given priority over an existing write request but may or may not have priority over the new read request.

In various embodiments, the first request can be processed in response to processing the second request in response to reaching a temporal threshold for processing the second request. For instance, if a specific write request has waited for one microsecond, the specific write request can be processed before a specific read request. Thresholds such as quantity thresholds are also considered. In embodiments, types of requests may be converted. The first request of the first type may be converted to a request of the second type. Then, the second request may be processed in response to processing the converted first request. For example, a read request may be converted to a write request. Such conversions may be clean (no stale data concerning shared resource) or dirty (may have stale data concerning shared resource—may re-read shared resource before writing).

FIG. 1 is a state diagram of a reader-writer lock methodology for a single particular thread to acquire a write lock according to embodiments. Method 000 (implementation 0) begins at block 001. A ReadPool global variable identifies which of Pool[0] or Pool[1] with index 0 or 1 may have active readers. To acquire the write lock, a writer spins until Pool [ReadPool]==0 (writer spins until any and all read locks have been released). To release the write lock, set the ReadPool= (ReadPool+1)%2 (switch ReadPool to other Pool[ ]). To acquire a read lock, spin until Pool[0] or Pool[1] IS_ADMITTING allows entrance and spin until my Pool[ ] index is the ReadPool. To release read lock, decrement my Pool[ ].

Readers in Pool[0] may be processed, including new readers, at 010. In response to a new writer, subsequent new readers may be assigned to Pool[1]. Existing (remaining) readers in Pool[0] may be processed at 020. In response to the last reader leaving Pool[0], the writer spin is satisfied (e.g., wait/hold for writing may conclude which may allow for initiating a writer). The writer may be processed at 030. In response to the writer releasing the write lock by setting the ReadPool=1, the reader spin is satisfied (e.g., wait/hold for reading may conclude which may allow for initiating a reader). Readers in Pool[1] may be processed, including new readers, at 040. In response to a new writer, subsequent new readers may be assigned to Pool[0]. Existing (remaining) readers in Pool[1] may be processed at 050. In response to the last reader leaving Pool[1], the writer spin is satisfied. The writer may be processed at 060. In response to the writer releasing the write lock by setting the ReadPool=0, the reader spin is satisfied. Readers in Pool[0] may be processed, including new readers, at 010. Such method may continue to cycle, as described. A read phase at 010 and 020 or at 040 and 050 may exist between consecutive writers. Such read phase may have zero readers.

Table 1 shows example semantics of an atomic process/method. Table 2 shows constants and shared data structures according to embodiments. Table 3 shows read methods according to embodiments. Table 4 shows write methods according to embodiments.

TABLE 1

```
// Show internal semantics, not a concurent implementation.
uint64_t FetchIfAnyEnabledIncrement(uint64_t *address,
uint64_t enableBits)
{
   uint64_t temp = *address;
   if (0 != (temp & enableBits)) {
      *address = temp + 1;
   }
   return temp;
}
uint64_t FetchIncrement(uint64_t *address)
   { return (*address)++; }
void StoreDecrement(uint64_t *address)
   { --(*address); }
void StoreAnd(uint64_t *address, uint64_t bits)
   { *address &= bits; }
void StoreOr(uint64_t *address, uint64_t bits)
   { *address |= bits; }
void StoreMax(uint64_t *address, uint64_t value)
   { if (value>*address) *address=value; }
```

TABLE 2

```
// Upper bit of Pool[ ].
#define IS_ADMITTING (1<<63)
// Lower 63 bits are the number of readers in each pool.
// Initialize Pool[0] for readers.
uint64_t Pool[2] = {IS_ADMITTING, 0};
int ReadPool = 0;
```

TABLE 3

```
int acquireReadLock(void) {
   int r, idPool;
   // Spin until join either of 2 pools.
   // Usually 1 or 2 attempts, but pre-emption can cause more.
   for (r=0, idPool=ReadPool;
      0==(r& IS_ADMITTING);
      idPool = (idPool+1)%2 ) {
      r = FetchIfAnyEnabledIncrement(&Pool[idPool],
            IS_ADMITTING);
   }
   // Spin until pool is granted read lock(s).
   while (idPool != ReadPool) ;
   return idPool;
}
void releaseReadLock(int idPool) {
   StoreDecrement(&Pool[idPool]);
}
```

TABLE 4

```
void acquireWriteLock(void) {
   int oldPool = ReadPool;
   int newPool = (oldPool+1)%2;
   // Admit future readers to newPool, not to oldPool.
   StoreOr( Pool[newPool], IS_ADMITTING);
```

TABLE 4-continued

```
        StoreAnd(Pool[oldPool],~IS_ADMITTING);
        // Spin until all reader leave oldPool.
        while (0 != Pool[oldPool] ) ;
        return;
    }
    void releaseWriteLock(void) {
        ReadPool = (ReadPool+1)%2;
    }
```

Figure 2:
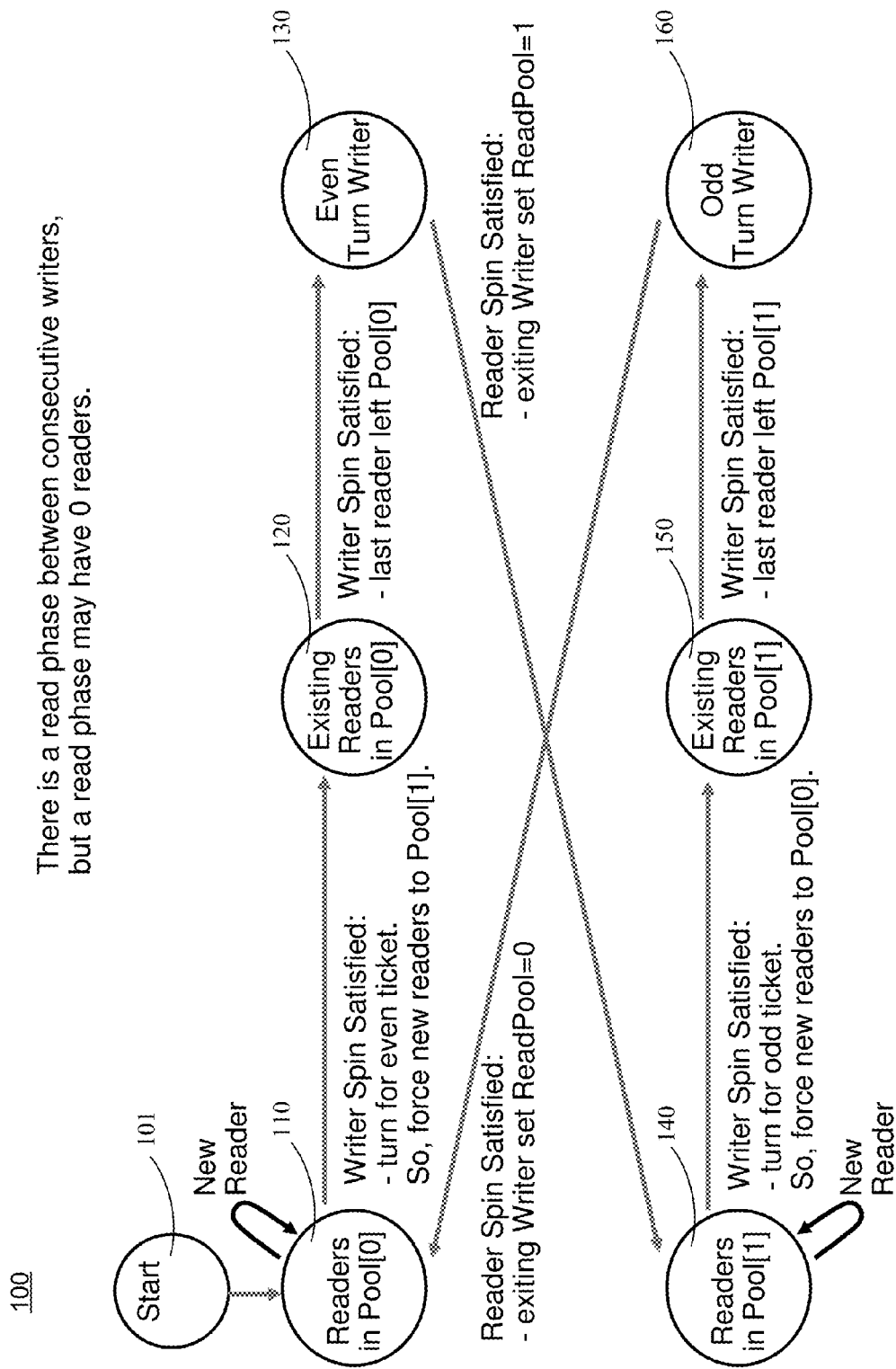
FIG. 2 is a state diagram of a reader-writer lock methodology for different threads to acquire a write lock according to embodiments.

FIG. 2 is a state diagram of a reader-writer lock methodology for different threads to acquire a write lock according to embodiments. Method 100 (implementation 1) begins at block 101. A writer may acquire a write lock. To do so, the writer acquires a ticket of a ticket lock and spins until a turn. If the writer has even ticket number (0,2,4,6, . . . ), then readers currently use Pool[0] and so the writer disables IS_ADMITTING of Pool[0], enables Pool[1] and spins until Pool[0] is empty. Alternatively, if the writer has odd ticket number (1,3, 5,7, . . . ) the roles of Pool[0] and Pool[1] are simply reversed. For the writer to release the write lock, an even writer would set ReadPool=1 and an odd writer would set ReadPool=0. A reader may acquire a read lock. To do so, the reader can spin until Pool[0] or Pool[1] with index 0 or 1 IS_ADMITTING allows entrance. The reader may spin until my Pool[ ] index is the ReadPool. For the reader to release the read lock, decrement my Pool[ ].

Readers in Pool[0] may be processed, including new readers, at 110. In response to satisfying a writer spin turning for an even ticket, subsequent new readers may be assigned to Pool[1]. Existing (remaining) readers in Pool[0] may be processed at 120. In response to the last reader leaving Pool[0], the writer spin is satisfied. The (even turn) writer may be processed at 130. In response to the (even turn) writer releasing the write lock by setting the ReadPool=1, the reader spin is satisfied. Readers in Pool[1] may be processed, including new readers, at 140. In response to satisfying a writer spin turning for an odd ticket, subsequent new readers may be assigned to Pool[0]. Existing (remaining) readers in Pool[1] may be processed at 150. In response to the last reader leaving Pool[1], the writer spin is satisfied. The (odd turn) writer may be processed at 160. In response to the (odd turn) writer releasing the write lock by setting the ReadPool=0, the reader spin is satisfied. Readers in Pool[0] may be processed, including new readers, at 110. Such method may continue to cycle, as described. A read phase at 110 and 120 or at 140 and 150 may exist between consecutive writers. Such read phase may have zero readers.

Table 5 shows constants and shared data structures according to embodiments. Table 6 shows read methods according to embodiments. Table 7 shows write methods according to embodiments. Table 8 shows example semantics of an atomic process/method.

TABLE 5

```
    // Upper bit of Pool[ ].
    #define IS_ADMITTING (1<<63)
    // Lower 63 bits are the number of readers in each pool.
    // Initialize Pool[0] for readers.
    uint64_t Pool[2] = {IS_ADMITTING, 0};
    int ReadPool = 0;
    // Ticket lock for writers.
    // Initialize first ticket and turn.
    uint64_t Ticket = 0;
    uint64_t Turn = 0;
```

TABLE 6

```
    int acquireReadLock(void) {
        int r, idPool;
        // Spin until join either of 2 pools.
        // Usually 1 or 2 attempts, but pre-emption can cause more.
        for (r=0, idPool=ReadPool;
             0==(r& IS_ADMITTING);
             idPool = (idPool+1)%2 ) {
            r = FetchIfAnyEnabledIncrement(&Pool[idPool],
                                IS_ADMITTING);
        }
        // Spin until pool is granted read lock(s).
        while (idPool != ReadPool) ;
        return idPool;
    }
    void releaseReadLock(int idPool) {
        StoreDecrement(&Pool[idPool]);
    }
```

TABLE 7

```
    uint64_t acquireWriteLock(void) {
        int64_t myTicket = FetchAndIncrement(&Ticket);
        while (myTicket != Turn); // Spin until my turn;
        int oldPool = myTicket%2;
        int newPool = (myTicket+1)%2;
        // Admit future readers to newPool, not to oldPool.
        StoreOr( Pool[newPool], IS_ADMITTING);
        StoreAnd(Pool[oldPool],~IS_ADMITTING);
        // Spin until all reader leave oldPool.
        while (0 != Pool[oldPool] ) ;
        return myTicket;
    }
    void releaseWriteLock(uint64_t myTicket) {
        int newPool = (myTicket+1)%2;
        ReadPool = newPool;
        // See Backup: May need msync( ) here on SMP with weak memory
        ordering.
        Turn = myTicket+1;
    }
```

Figure 3:
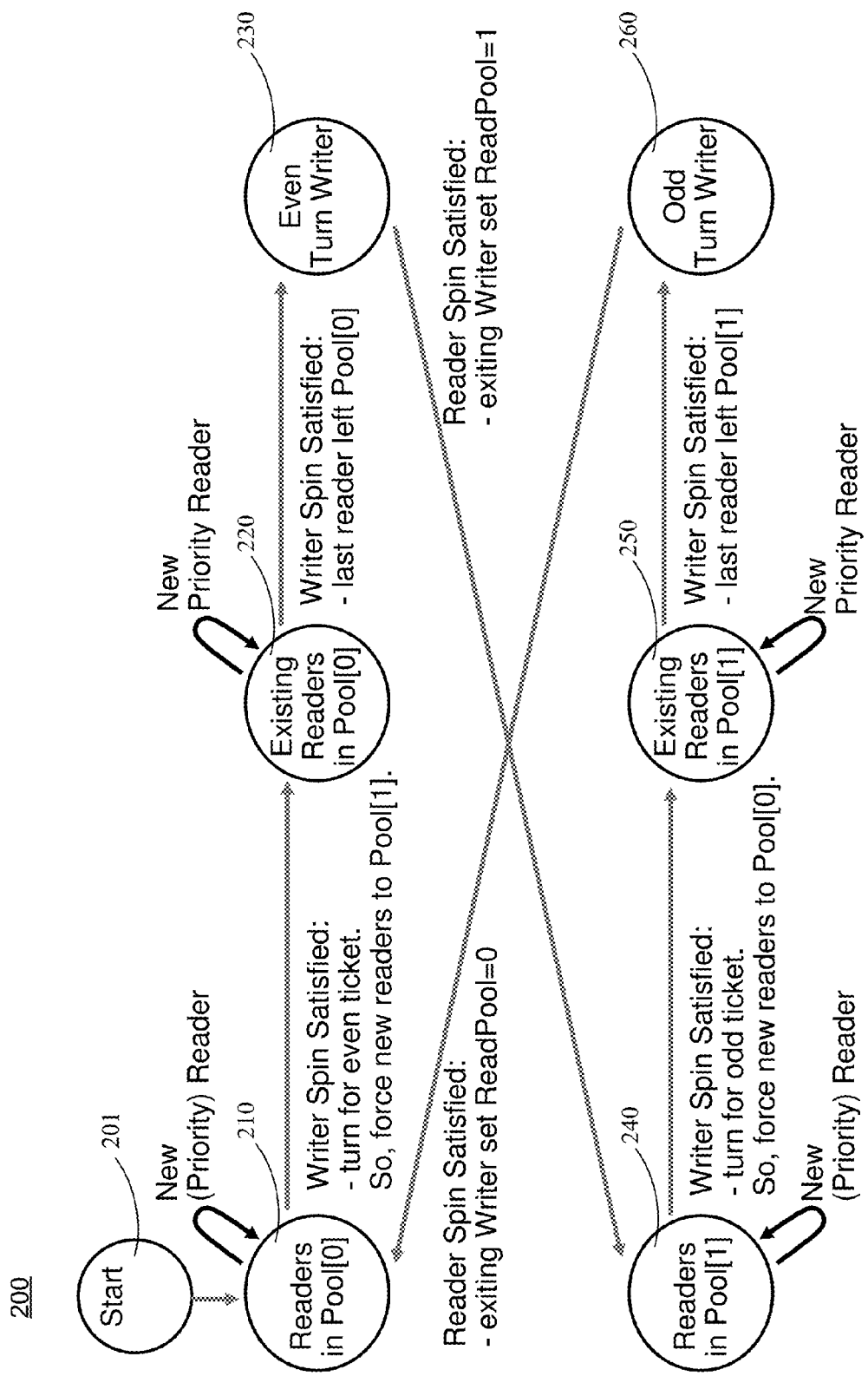
FIG. 3 is a state diagram of a reader-writer lock methodology for a priority reader according to embodiments.

FIG. 3 is a state diagram of a reader-writer lock methodology for a priority reader according to embodiments. Method 200 (implementation 2) begins at block 201. Writers process as in method 100 (implementation 1), but acquireWriteLock( )sets Priority_Read_Enable, so that a sequence of priority readers does not livelock out other participants. Existence of an outstanding non-priority reader implies an outstanding writer. Readers process as in method 100 (implementation 1). With Priority_Read_Enable, a Priority Reader can enter a non-0 Pool[ReadPool], even if IS_ADMITTING already has been disabled (writer is polling for 0==Pool[ReadPool], so priority reader can enter, as long as Pool[ReadPool] has not yet reached 0).

Readers in Pool[0] may be processed, including new readers which can be priority readers, at 210. In response to satisfying a writer spin turning for an even ticket, subsequent new readers may be assigned to Pool[1]. Existing (remaining) readers, including new priority readers, in Pool[0] may be processed at 220. In response to the last reader leaving Pool[0], the writer spin is satisfied. The (even turn) writer may be processed at 230. In response to the (even turn) writer releasing the write lock by setting the ReadPool=1, the reader spin is satisfied. Readers in Pool[1] may be processed, including new readers which can be priority readers, at 240. In response to satisfying a writer spin turning for an odd ticket, subsequent new readers may be assigned to Pool[0]. Existing (remaining) readers, including new priority readers, in Pool[1] may be processed at 250. In response to the last reader leaving Pool[1], the writer spin is satisfied. The (odd turn) writer may be processed at 260. In response to the (odd turn) writer releasing the write lock by setting the ReadPool=0, the reader spin is satisfied. Readers in Pool[0] may be processed, including new readers which can be priority readers, at 210. Such method may continue to cycle, as described.

Table 9 shows shared data and processes/methods according to embodiments.

TABLE 9

```
// Implementation 2 as in 1, except for shared data and methods below.
uint64_t Priority_Read_Enabled = TRUE;
int priorityAcquireReadLock(void) {
    if (Priority_Read_Enabled) {
        int idPool = ReadPool;
        // ~0 requires Pool[idPool] to have IS_ADMITTING or other
        readers.
        int r = FetchIfAnyEnabledIncrement(&Pool[idPool],~0);
        if (r) {
            // Ensure and spin until pool is granted read lock(s).
            // E.g. due to a pre-empt, above idPool=ReadPool may be very
            stale.
            while (idPool != ReadPool) ;
            return idPool;
        }
    }
    return acquireReadLock( );
}
// acquireWriteLock( ) as in Implemenatation 1, plus lines marked below.
uint64_t acquireWriteLock(void) {
    uint64_t entryTime = getTime( ); // For Implementation 2.
    uint64_t myTicket = FetchAndIncrement(&Ticket);
    while (myTicket != Turn); // Spin until my turn;
    int oldPool = myTicket%2;
    int newPool = (myTicket+1)%2;
    // Admit future readers to newPool, not to oldPool.
    StoreOr( Pool[newPool], IS_ADMITTING);
    StoreAnd(Pool[oldPool],~IS_ADMITTING);
    // Spin until all reader leave oldPool.
    while (0 != Pool[oldPool] ) {
        // Below for Implementation 2.
        // Minimize cache traffic by only writing changed
        Priority_Read_Enabled.
        if (Priority_Read_Enabled &&
            getTime( )>(entryTime+Patience_for_Priority_Read) )
            { Priority_Read_Enabled = FALSE; }
    }
    // Below for Implementation 2. Good enough to always re-enable.
    Priority_Read_Enabled = TRUE;
    return myTicket;
}
```

Figure 4:
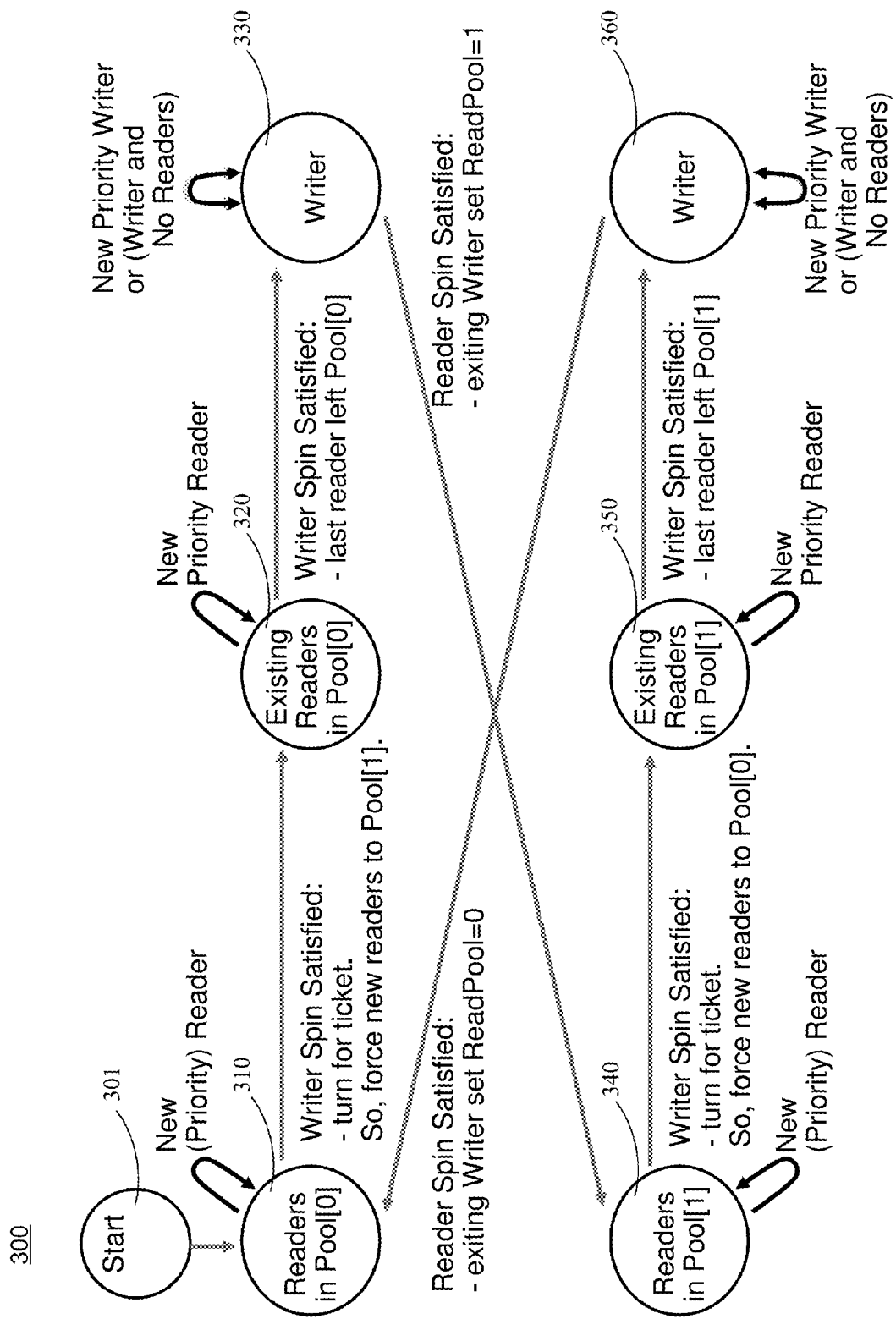
FIG. 4 is a state diagram of a reader-writer lock methodology for a priority writer according to embodiments.

FIG. 4 is a state diagram of a reader-writer lock methodology for a priority writer according to embodiments. Method 300 (implementation 3) begins at block 301. A priority writer may use a same ticket and turn as a (regular) writer. The priority writer can effectively increase the priority of all outstanding previous writer tickets (priority writer does Store-Max(Max_Priority_Ticket, myTicket)). In other aspects, the priority writer can be the same as a regular writer (e.g., as described next). With Priority_Write_Enabled and within Turn<=Max_Priority_Ticket, a sequence of multiple writers can each acquire and release the write lock without intervening read phases at 310 and 320 and at 340 and 350. Also when there are no readers, a sequence of multiple non-priority writers can each acquire and release the write lock without intervening read phases. In other instances, a writer may start a read phase as in method 100 (implementation 1). A previous writer may use a READPOOL_BEFORE_WRITER bit in turn to inform a next writer. In contrast to method 100 (implementation 1), myTicket does not identify the current pool as one or more writers may exist between read pools. ReadPool may be used to identify the current pool (e.g., using msync( )) thus FIG. 4 does not refer to even and odd writers. Readers may operate as in method 100 (implementation 1), but acquireReadLock( ) sets Priority_Write_Enabled, so that a sequence of priority writers does not livelock out readers.

Readers in Pool[0] may be processed, including new readers which can be priority readers, at 310. In response to satisfying a writer spin turning for a ticket, subsequent new readers may be assigned to Pool[1]. Existing (remaining) readers, including new priority readers, in Pool[0] may be processed at 320. In response to the last reader leaving Pool [0], the writer spin is satisfied. The writer (or when a new priority writer, or when a writer and no readers) may be processed at 330. In response to the writer releasing the write lock by setting the ReadPool=1, the reader spin is satisfied. Readers in Pool[1] may be processed, including new readers which can be priority readers, at 340. In response to satisfying a writer spin turning for a ticket, subsequent new readers may be assigned to Pool[0]. Existing (remaining) readers, including new priority readers, in Pool[1] may be processed at 350. In response to the last reader leaving Pool[1], the writer spin is satisfied. The writer (or when a new priority writer, or when a writer and no readers) may be processed at 360. In response to the writer releasing the write lock by setting the Read-Pool=0, the reader spin is satisfied. Readers in Pool[0] may be processed, including new readers which can be priority readers, at 310. Such method may continue to cycle, as described.

Table 10 shows shared data and processes/methods according to embodiments.

TABLE 10

```
// Implementation 3 as in 1 and 2, except for shared data and methods
below.
uint64_t Priority_Write_Enabled = TRUE;
#define READPOOL_BEFORE_WRITER (1<<63)
uint64_t Max_Priority_Ticket = 0;
// acquireReadLock( ) as in Implemenatation 1, plus lines marked below.
int acquireReadLock(void) {
    uint64_t entryTime = getTime( ); // For Implementation 3.
    int r, idPool;
    // Spin until join either of 2 pools.
    // Usually 1 or 2 attempts, but pre-emption can cause more.
    for (r=0, idPool=ReadPool;
        0==(r& IS_ADMITTING);
        idPool = (idPool+1)%2 ) {
        r = FetchIfAnyEnabledIncrement(&Pool[idPool],
            IS_ADMITTING);
    }
    // Spin until pool is granted read lock(s).
    while (idPool != ReadPool) {
        // Below for Implementation 3. Minimize cache traffic by only
writing changed Priority_Write_Enabled.
        if (Priority_Write_Enabled &&
            getTime( )>(entryTime+Patience_for_Priority_Write) )
            { Priority_Write_Enabled = FALSE; }
    }
    // Below for Implementation 3. Re-enable if above may have disabled.
    if (Priority_Write_Enabled &&
        getTime( )>(entryTime+Patience_for_Priority_Write) )
        { Priority_Write_Enabled = TRUE; }
    return idPool;
}
// priorityAcquireReadLock( ) as in Implemenatation 2, plus lines marked
below.
int priorityAcquireReadLock(void) {
    uint64_t entryTime = getTime( ); // For Implementation 3.
    if (Priority_Read_Enabled) {
        int idPool = ReadPool;
        // ~0 requires Pool[idPool] to have IS_ADMITTING or other
        readers.
        int r = FetchIfAnyEnabledIncrement(&Pool[idPool],~0);
        if (r) {
            // Ensure and spin until pool is granted read lock(s).
            // E.g. due to a pre-empt, Above idPool=ReadPool may have been
            very stale.
            while (idPool != ReadPool) {
                // Below for Implementation 3. Minimize cache traffic by only
```

TABLE 10-continued

```
        writing change.
        if (Priority_Write_Enabled &&
        getTime( )>(entryTime+Patience_for_Priority_Write) )
            { Priority_Write_Enabled = FALSE; }
        }
        // Below for Implementation 3. Re-enable if above may have
        disabled.
        if (Priority_Write_Enabled &&
        getTime( )>(entryTime+Patience_for_Priority_Write) )
            { Priority_Write_Enabled = TRUE; }
        return idPool;
        }
    }
    return acquireReadLock( );
}
// acquireWriteLock( ) with READPOOL_BEFORE_WRITER
effectively as in Implemenatation 2, with lines marked below.
uint64_t acquireWriteLock(void) {
    uint64_t myTicket = FetchAndIncrement(&Ticket);
    return commonAcquireWriteLock(myTicket);
}
uint64_t priorityAcquireWriteLock(void) {
    uint64_t myTicket = FetchAndIncrement(&Ticket);
    StoreMax(&Max_Priority_Ticket, myTicket);
    return commonAcquireWriteLock(myTicket);
}
uint64_t commonAcquireWriteLock(uint64_t myTicket) {
    uint64_t entryTime = getTime( ); // For Implementation 2.
    while (myTicket != (Turn&~READPOOL_BEFORE_WRITER);
    // Spin until my turn;
    if (0 != (Turn&READPOOL_BEFORE_WRITER)) {
        int oldPool = ReadPool;
        int newPool = (oldPool+1)%2;
        // Admit future readers to newPool, not to oldPool.
        StoreOr( Pool[newPool], IS_ADMITTING);
        StoreAnd(Pool[oldPool],~IS_ADMITTING);
        // Spin until all reader leave oldPool.
        while (0 != Pool[oldPool] ) {
            // Below for Implementation 2.
            // Minimize cache traffic by only writing changed
            Priority_Read_Enabled.
            if (Priority_Read_Enabled &&
            getTime( )>(entryTime+Patience_for_Priority_Read) )
                { Priority_Read_Enabled = FALSE; }
        }
        // Below for Implementation 2. Good enough to always re-enable.
        Priority_Read_Enabled = TRUE;
    }
    return myTicket;
}
void releaseWriteLock(uint64_t myTicket) {
    int newPool = (ReadPool+1)%2;
    // If (next writer and no readers)
    //    or if priority within time limit,
    // then jump to next writer without a read phase.
    if (   ( Ticket>Turn && 0==(Pool[newPool]&~IS_ADMITTING) )
        || (  Priority_Write_Enabled
            && Max_Priority_Ticket > myTicket) ) {
        Turn = (myTicket+1);
    } else {
        ReadPool = newPool;
        msync( ); // For SMP with weak memory ordering.
        Turn = (myTicket+1) | READPOOL_BEFORE_WRITER;
    }
}
```

Figure 5:
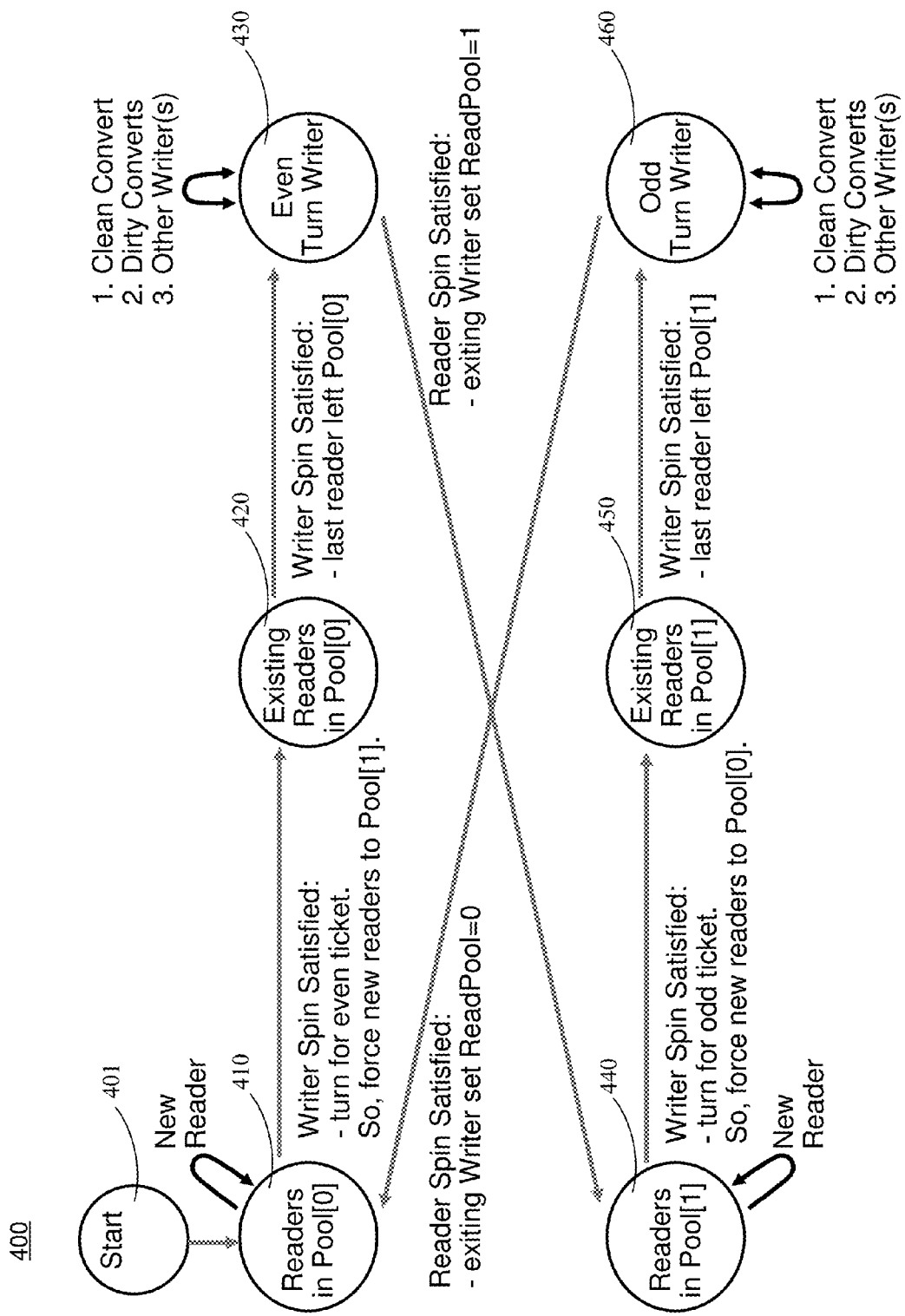
FIG. 5 is a state diagram of a reader-writer lock methodology for a reader converted to a writer according to embodiments.

FIG. 5 is a state diagram of a reader-writer lock methodology for a reader converted to a writer according to embodiments. Method 400 (implementation 4) begins at block 401. A clean convert refers to a reader converted to a writer, with no other intervening writer(s). In embodiments, a clean convert has no stale data concerning the data shared across readers and writers. In a given example reader phase, at 410 and 420 or at 440 and 450, at most one reader can be a clean convert. A clean convert may be called by an active reader. Success return means this and all other readers have left Pool[ ] (read phase has ended since all read locks have been released) and this thread is now the writer. Fail means another reader will successfully clean convert and the thread remains as a reader.

A dirty convert refers to a reader converted to a writer, perhaps with other intervening writer(s). In embodiments, a dirty convert may have stale data concerning the data shared across readers and writers. A dirty convert may need to re-read the shared resource before writing. In a given example reader phase, multiple readers can be a dirty converts. In embodiments, if a thread fails clean conversion, the thread can request dirty conversion. The motivation for the dirty convert includes processing before other writers. A writer which just closed the read pool will schedule (all of) the dirty converts before scheduling itself (a clean convert schedules itself before the dirty converts). In embodiments, all dirty converts and at least one writer (assuming there are other writer requests) execute before the next read phase. A dirty convert succeeds except if disabled by other threads which are impatient. Success return means this and all other readers have left Pool[ ] (read phase has ended) and this thread is now the writer. In embodiments, the thread may join dirty converts using FetchIncrement(&ConvertTicket).

Readers in Pool[0] may be processed, including new readers, at 410. In response to satisfying a writer spin turning for an even ticket, subsequent new readers may be assigned to Pool[1]. Existing (remaining) readers in Pool[0] may be processed at 420. In response to the last reader leaving Pool[0], the writer spin is satisfied. The (even turn) writer may be processed at 430. Writers may be processed at 430 in an order such as: clean convert writer(s) (if any), dirty convert writer(s) (if any), and then other writer(s) (if any). In response to the (even turn) writer releasing the write lock by setting the ReadPool=1, the reader spin is satisfied. Readers in Pool[1] may be processed, including new readers, at 440. In response to satisfying a writer spin turning for an odd ticket, subsequent new readers may be assigned to Pool[0]. Existing (remaining) readers in Pool[1] may be processed at 450. In response to the last reader leaving Pool[1], the writer spin is satisfied. The (odd turn) writer may be processed at 460. Writers may be processed at 460 in an order such as: clean convert writer(s) (if any), dirty convert writer(s) (if any), and then other writer(s) (if any). In response to the (odd turn) writer releasing the write lock by setting the ReadPool=0, the reader spin is satisfied. Readers in Pool[0] may be processed, including new readers, at 410. Such method may continue to cycle, as described.

Other considerations may apply in various embodiments. Positive performance impacts may result from use of embodiments of the reader-writer lock on a Non-Uniform Memory Architecture (NUMA). In particular, positive performance impacts may result relating to NUMA reads and writes to the data protected by the reader-writer lock. In embodiments, lock cohorting may be adapted for such NUMA-aware reader-writer locks.

In embodiments, ReadPool can be changed after all readers have left Pool[ ] since the readers have seen ReadPool. For example, a preempted waiting reader might see ReadPool arbitrarily late. If memory ordering is so weak that a reader sees a stale ReadPool value and thus incorrectly or prematurely gets a read lock, msync( ) can force memory ordering. For instance, in releaseWriteLock( ), update ReadPool, msync, and update turn. As another example, introduce an IS_READING bit to each Pool[ ] element (instead of, or in addition to, ReadPool).

Embodiments might allow some priority readers in each read phase, regardless of how long a writer has been waiting. Where a priority writer has a higher priority than outstanding readers, embodiments may have a priority writer also with higher priority than readers not outstanding (e.g., being processed).

Aspects of the disclosure include a method for implementing a reader-writer lock having a write lock requested by a thread. The method can include structuring the reader-writer lock to have a first counter, a second counter, and a flag. The first counter may be configured to count a number of read locks held. An atomic process may be used to increment the first counter in response to a first bit of the first counter being enabled. In embodiments, the first bit may be initially set to be enabled. The second counter may be configured to count a number of outstanding read lock requests. The atomic process may be used to increment the second counter in response to a second bit of the second counter being enabled. In embodiments, the second bit may be initially set to be disabled. The flag may identify either the first counter or the second counter but not both, and can be configured to discern the first counter from the second counter. In embodiments, the flag may be initially set to identify the first counter.

Aspects of the disclosure may include preparing a read lock associated with a flagged counter of the first and second counters. The preparing can include using the atomic process in association with at least one counter of the first and second counters. The read lock may be acquired by polling the flag to identify the flagged counter of the first and second counters. The read lock can be released using the flagged counter to decrement a value of the flagged counter.

Aspects of the disclosure may include preparing a write lock. The preparing can include disabling the flagged counter and enabling an unflagged counter of the first and second counters. The write lock may be acquired by polling the flagged counter until the value of the flagged counter reaches zero. The write lock can be released using the flag to unflag the flagged counter and flag the unflagged counter.

In embodiments, the atomic process can be one of: software-based using compare and swap, software-based using load-link and store-conditional, or hardware-based using an atomic memory operation. In embodiments, the write lock can be requested by multiple threads. The reader-writer lock may be accompanied by a ticket lock. The ticket lock may be acquired before preparing the write lock. The ticket lock may be released after releasing the write lock.

Aspects of the disclosure include priority readers/writers. In embodiments, the read lock may be acquired with priority. The acquiring can use a supplemental atomic process to increment the flagged counter in response to the flagged counter being enabled or the value of the flagged counter being non-zero or both. In embodiments, the read lock may be acquired with priority, using a priority read status, in response to the priority read status being enabled. The write lock may be acquired through a series of operations. A first time, configured to be a current time, may be noted. The write lock may be prepared by disabling the flagged counter and enabling an unflagged counter of the first and second counters. The write lock may be acquired by polling the flagged counter until the value of the flagged counter reaches zero. During polling, the priority read status may be disabled in response to a threshold being exceeded. The threshold may be the difference between the first time and a second time configured to be an elapsed time. In response, the priority read status may be enabled.

In embodiments, the write lock may be acquired with priority. A ticket value may be obtained from the ticket lock. A priority ticket status may be set to a maximum of a current priority ticket value and the obtained ticket value. The ticket lock may be acquired. A read pool status may be enabled. The write lock may be prepared by disabling the flagged counter and enabling an unflagged counter of the first and second counters. The write lock may be acquired by polling the flagged counter until the value of the flagged counter reaches zero. The write lock may be released through a series of operations. The priority ticket status and the obtained ticket value may be compared. The read pool status can be disabled in response to the priority ticket status being greater than the obtained ticket value. In response to the priority ticket status being less than or equal to the obtained ticket value, the write lock may be released (using the flag to unflag the flagged counter and flag the unflagged counter) and the read pool status may be enabled. In response, the ticket lock may be released.

In embodiments, the write lock may be acquired with priority (using a priority write status) in response to the priority write status being enabled. The read lock may be acquired through a series of operations. A first time configured to be a current time may be noted. The read lock associated with a flagged counter of the first and second counters may be prepared. The preparing can include using the atomic process in association with at least one counter of the first and second counters. The read lock may be acquired by polling the flag to identify the flagged counter of the first and second counters. During polling, the priority write status may be disabled in response to a threshold being exceeded. The threshold may be the difference between the first time and a second time configured to be an elapsed time. In response, the priority write status may be enabled.

Aspects of the disclosure include attempting to convert or converting the read lock to a converted write lock. An auxiliary atomic process configured to compare values of a set of tickets and a set of turns may be used. Equivalency of the convert ticket value of the set of tickets and a convert turn value of the set of turns may be determined. A convert ticket value can be incremented. In response to incrementing the convert ticket value, the write lock can be prepared and acquired. The preparing can include disabling the flagged counter and enabling an unflagged counter of the first and second counters. The write lock may be acquired by polling the flagged counter until the value of the flagged counter reaches a predetermined threshold (e.g., zero). In response to not incrementing the convert ticket value, the attempted conversion has failed. The converted write lock can be released through a series of operations. The read lock may be released using the flagged counter to decrement the value of the flagged counter. An auxiliary atomic process configured to compare values of a set of tickets and a set of turns may be used. Equivalency of a writer ticket value of the set of tickets and a writer turn value of the set of turns may be determined. The write lock may be released using the flag to unflag the flagged counter and flag the unflagged counter. The writer turn value of the set of turns may be incremented.

Figure 6:
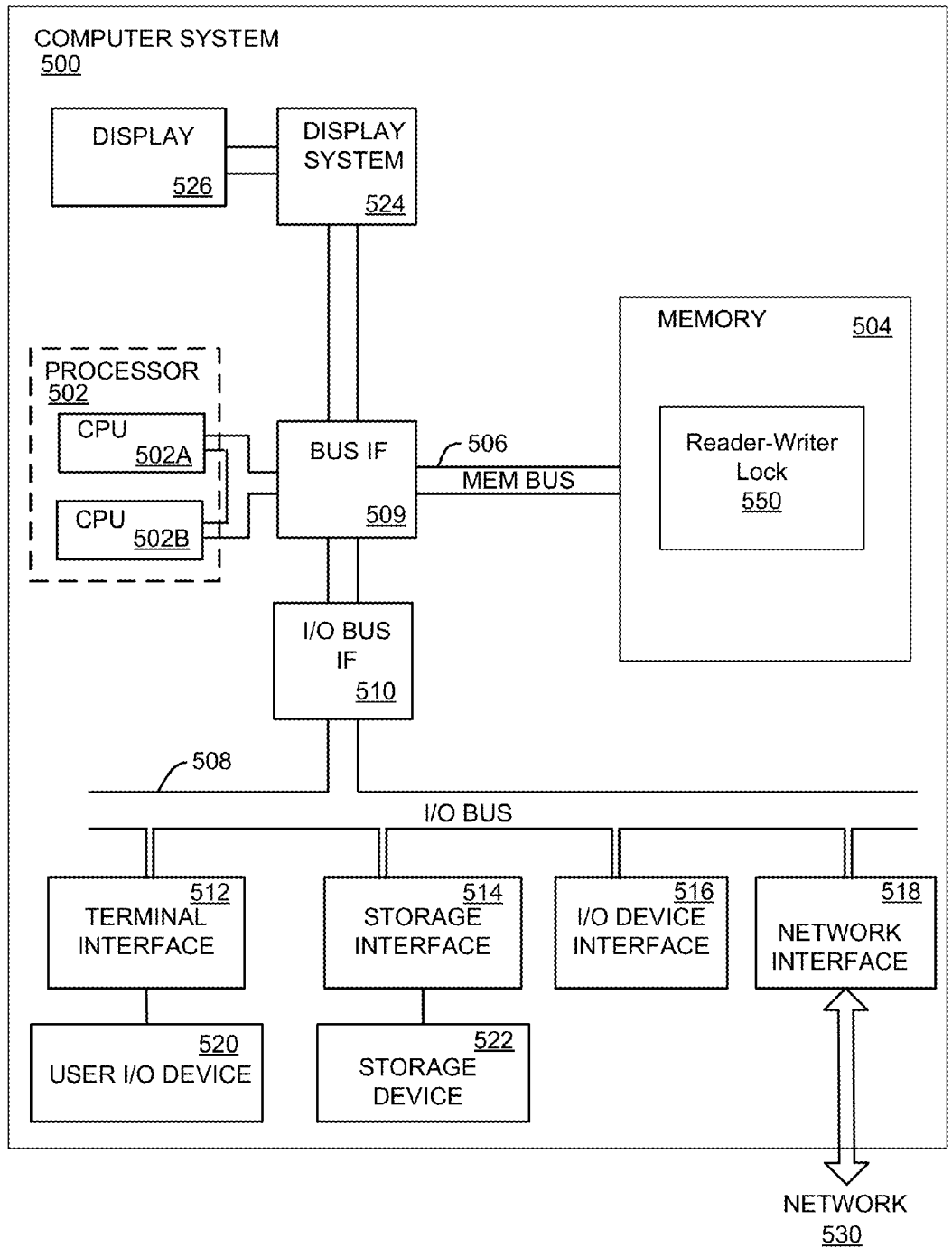
FIG. 6 depicts a high-level block diagram of a computer system for implementing various embodiments.

FIG. 6 depicts a high-level block diagram of a computer system 500 for implementing various embodiments. The mechanisms and apparatus of the various embodiments disclosed herein apply equally to any appropriate computing system. The major components of the computer system 500 include one or more processors 502, a memory 504, a terminal interface 512, a storage interface 514, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain one or more general-purpose programmable central processing units (CPUs) 502A and 502B, herein generically referred to as the processor 502. In embodiments, the computer system 500 may contain multiple processors; however, in certain embodiments, the computer system 500 may alternatively be a single CPU system. Each processor 502 executes instructions stored in the memory 504 and may include one or more levels of on-board cache.

In embodiments, the memory 504 may include a random-access semiconductor memory, storage device, or storage medium (either volatile or non-volatile) for storing or encoding data and programs. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 504 may store all or a portion of the various programs, modules and data structures for processing data transfers as discussed herein. For instance, the memory 504 can store a reader-writer lock 550. In embodiments, the reader-writer lock 550 may include instructions or statements that execute on the processor 502 or instructions or statements that are interpreted by instructions or statements that execute on the processor 502 to carry out the functions as further described below. In certain embodiments, the reader-writer lock 550 is implemented in hardware via semiconductor devices, chips, logical gates, circuits, circuit cards, and/or other physical hardware devices in lieu of, or in addition to, a processor-based system. In embodiments, the reader-writer lock 550 may include data in addition to instructions or statements.

The computer system 500 may include a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 514, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The storage interface 514 supports the attachment of one or more disk drives or direct access storage devices 522 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 522 may be implemented via any type of secondary storage device. The contents of the memory 504, or any portion thereof, may be stored to and retrieved from the storage device 522 as needed. The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 530.

Although the computer system 500 shown in FIG. 6 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

In various embodiments, the computer system 500 is a multi-user mainframe computer system, a single-user system, or a server computer or similar device that has little or no direct user interface, but receives requests from other computer systems (clients). In other embodiments, the computer system 500 may be implemented as a desktop computer, portable computer, laptop or notebook computer, tablet computer, pocket computer, telephone, smart phone, or any other suitable type of electronic device.

FIG. 6 depicts several major components of the computer system 500. Individual components, however, may have greater complexity than represented in FIG. 6, components other than or in addition to those shown in FIG. 6 may be present, and the number, type, and configuration of such components may vary. Several particular examples of additional complexity or additional variations are disclosed herein; these are by way of example only and are not necessarily the only such variations. The various program components illustrated in FIG. 6 may be implemented, in various embodiments, in a number of different manners, including using various computer applications, routines, components, programs, objects, modules, data structures, etc., which may be referred to herein as "software," "computer programs," or simply "programs."

In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A method for implementing a reader-writer lock having a write lock requested by a thread, the method comprising:
   structuring the reader-writer lock to have:
     a first counter configured to count, using an atomic process to increment the first counter in response to a first bit of the first counter being enabled, a number of read locks held, wherein the first bit is initially set to be enabled;
     a second counter configured to count, using the atomic process to increment the second counter in response to a second bit of the second counter being enabled, a number of outstanding read lock requests, wherein the second bit is initially set to be disabled; and
     a flag, identifying either the first counter or the second counter but not both, configured to discern the first counter from the second counter, wherein the flag is initially set to identify the first counter;
   preparing, using the atomic process in association with at least one counter of the first and second counters, a read lock associated with a flagged counter of the first and second counters;
   acquiring, by polling the flag to identify the flagged counter of the first and second counters, the read lock;
   releasing, using the flagged counter to decrement a value of the flagged counter, the read lock;
   preparing, by disabling the flagged counter and enabling an unflagged counter of the first and second counters, a write lock;
   acquiring, by polling the flagged counter until the value of the flagged counter reaches zero, the write lock; and
   releasing, using the flag to unflag the flagged counter and flag the unflagged counter, the write lock.

2. The method of claim 1, wherein the atomic process is one of:
   software-based using compare and swap;
   software-based using load-link and store-conditional; and
   hardware-based using an atomic memory operation.

3. The method of claim 1, wherein the write lock is requested by multiple threads, the method comprising:
   accompanying the reader-writer lock with a ticket lock;
   acquiring the ticket lock before preparing the write lock; and
   releasing the ticket lock after releasing the write lock.

4. The method of claim 1, further comprising acquiring with priority, using a supplemental atomic process to increment the flagged counter in response to at least one of the flagged counter being enabled or the value of the flagged counter being non-zero, the read lock.

5. The method of claim 4, further comprising:
   acquiring with priority, using a priority read status, the read lock in response to the priority read status being enabled; and
   acquiring the write lock by:
     noting a first time configured to be a current time;
     preparing, by disabling the flagged counter and enabling the unflagged counter of the first and second counters, the write lock;
     acquiring, by polling the flagged counter until the value of the flagged counter reaches zero, the write lock;
     during polling, disabling the priority read status in response to a threshold being exceeded, the threshold being the difference between the first time and a second time configured to be an elapsed time; and
     enabling the priority read status.

6. The method of claim 3, further comprising acquiring with priority the write lock, wherein acquiring with priority the write lock includes:
   obtaining a ticket value from the ticket lock;
   setting a priority ticket status to a maximum of a current priority ticket value and the obtained ticket value;
   acquiring the ticket lock;
   in response to a read pool status being enabled:
     preparing, by disabling the flagged counter and enabling the unflagged counter of the first and second counters, the write lock;
     acquiring, by polling the flagged counter until the value of the flagged counter reaches zero, the write lock;
   releasing the write lock by:
     comparing the priority ticket status and the obtained ticket value;
     disabling the read pool status in response to the priority ticket status being greater than the obtained ticket value;

in response to the priority ticket status being less than or equal to the obtained ticket value, releasing, using the flag to unflag the flagged counter and flag the unflagged counter, the write lock, and enabling the read pool status; and releasing the ticket lock.

7. The method of claim 6, further comprising:

acquiring with priority, using a priority write status, the write lock in response to the priority write status being enabled; and acquiring the read lock by:

noting a first time configured to be a current time;

preparing, using the atomic process in association with at least one counter of the first and second counters, the read lock associated with the flagged counter of the first and second counters;

acquiring, by polling the flag to identify the flagged counter of the first and second counters, the read lock;

during polling, disabling the priority write status in response to a threshold being exceeded, the threshold being the difference between the first time and a second time configured to be an elapsed time; and enabling the priority write status.

8. The method of claim 3, further comprising:

converting the read lock to a converted write lock by:

incrementing a convert ticket value in response to determining, using an auxiliary atomic process configured to compare values of a set of tickets and a set of turns, equivalency of the convert ticket value of the set of tickets and a convert turn value of the set of turns; and in response to incrementing the convert ticket value, preparing, by disabling the flagged counter and enabling the unflagged counter of the first and second counters, the write lock, and acquiring, by polling the flagged counter until the value of the flagged counter reaches zero, the write lock; and releasing the converted write lock by:

releasing, using the flagged counter to decrement the value of the flagged counter, the read lock; and in response to determining, using an auxiliary atomic process configured to compare values of a set of tickets and a set of turns, equivalency of a writer ticket value of the set of tickets and a writer turn value of the set of turns, releasing, using the flag to unflag the flagged counter and flag the unflagged counter, the write lock, and incrementing the writer turn value of the set of turns.

\* \* \* \* \*